(12) United States Patent
Yang et al.

(10) Patent No.: US 7,912,082 B2
(45) Date of Patent: Mar. 22, 2011

(54) SHARED VIRTUAL NETWORK INTERFACE

(75) Inventors: Andrew C. Yang, Sunnyvale, CA (US); James J. Yu, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 261 days.

(21) Appl. No.: 12/135,348

(22) Filed: Jun. 9, 2008

(65) Prior Publication Data
US 2009/0304022 A1    Dec. 10, 2009

(51) Int. Cl.
*H04L 12/66*    (2006.01)
(52) U.S. Cl. ........................................ 370/463
(58) Field of Classification Search .................. 370/463, 370/477, 229
See application file for complete search history.

(56) References Cited

U.S. PATENT DOCUMENTS

| | | | |
|---|---|---|---|
| 5,765,023 A * | 6/1998 | Leger et al. | 710/22 |
| 6,611,891 B1 * | 8/2003 | Hewitt et al. | 710/306 |
| 6,971,044 B2 * | 11/2005 | Geng et al. | 714/11 |
| 7,630,368 B2 * | 12/2009 | Tripathi et al. | 370/389 |
| 2005/0053060 A1 | 3/2005 | Pettey | |
| 2008/0240092 A1 * | 10/2008 | Moratt et al. | 370/389 |

OTHER PUBLICATIONS

U.S. Appl. No. 12/135,368, filed Jun. 9, 2008 Entitled: "System for Sharing a Network Port of a Network Interface Including a Link for Connection to Another Shared Network Interface" First Named Inventor: James J Yu.

* cited by examiner

*Primary Examiner* — Derrick W Ferris
*Assistant Examiner* — Mohammad Anwar
(74) *Attorney, Agent, or Firm* — Meyertons, Hood, Kivlin, Kowert & Goetzel, P.C.; Stephen J. Curran (57) ABSTRACT

A system includes one or more processing units coupled to a network interface unit. The network interface unit may include a network port for connection to a network and a virtual interface that may be configured to distribute an available communication bandwidth of the network port between the one or more processing units. The network port may include a shared media access control (MAC) unit. The virtual interface may include a plurality of processing unit resources each associated with a respective one of the one or more processing units. Each of the processing unit resources may include an I/O interface unit coupled to a respective one of the one or more processing units via an I/O interconnect, and an independent programmable virtual MAC unit that is programmably configured by the respective one of the one or more processing units. The virtual interface may also include a receive datapath and a transmit datapath that are coupled between and shared by the plurality of processing unit resources and the network port.

14 Claims, 4 Drawing Sheets

SHARED VIRTUAL NETWORK INTERFACE

BACKGROUND OF THE INVENTION

1. Field of the Invention

This invention relates to networking systems and, more particularly, to shared network resources.

2. Description of the Related Art

Networked computer systems are typically connected to a network using some type of network interface. The type of interface varies depending on the network protocol. For example, in an Ethernet network, a computer system or processing node may connect to the network using a network interface card (NIC). The NIC may be assigned a unique medium access control (MAC) address that identifies that NIC to all the other computer systems in the world that may be connected to the network. In a conventional system, each processing node may have its own NIC, and thus its own network port.

In computer systems that include a large number of processing nodes such as, for example, server systems that have a large number of blade processing units in each chassis, the component count of the resources used to access the network can get quite large. In addition, the costs associated the networking components may also be high, especially for some of the newer standards such as 10 Gigabit Ethernet (10 GE), for example. This may be especially true since each of the processing units may typically only use a fraction of the bandwidth that a 10 GE link can provide. Additional drawbacks associated with large networked systems include the large amount of rack space that must be dedicated to cabling, network port connectors, and the like, and the mechanical issues and mean time between failure (MTBF) for these components. Accordingly, it may be desirable to have shared resources in a networked environment.

SUMMARY

Various embodiments of a shared virtual network interface are disclosed. In one embodiment, a system includes one or more processing units coupled to a network interface unit. The network interface unit may include a network port for connection to a network such as an Ethernet network, for example, and a virtual interface that may be configured to distribute an available communication bandwidth of the network port between the one or more processing units. The network port may include a shared media access control (MAC) unit. The virtual interface may be coupled to the network port. The virtual interface may include a plurality of processing unit resources each associated with a respective one of the one or more processing units. Each of the processing unit resources may include an I/O interface unit coupled to a respective one of the one or more processing units via an I/O interconnect, and an independent programmable virtual MAC unit that is programmably configured by the respective one of the one or more processing units. The virtual interface may also include a receive datapath and a transmit datapath that are coupled between and shared by the plurality of processing unit resources and the network port.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Figure 1:
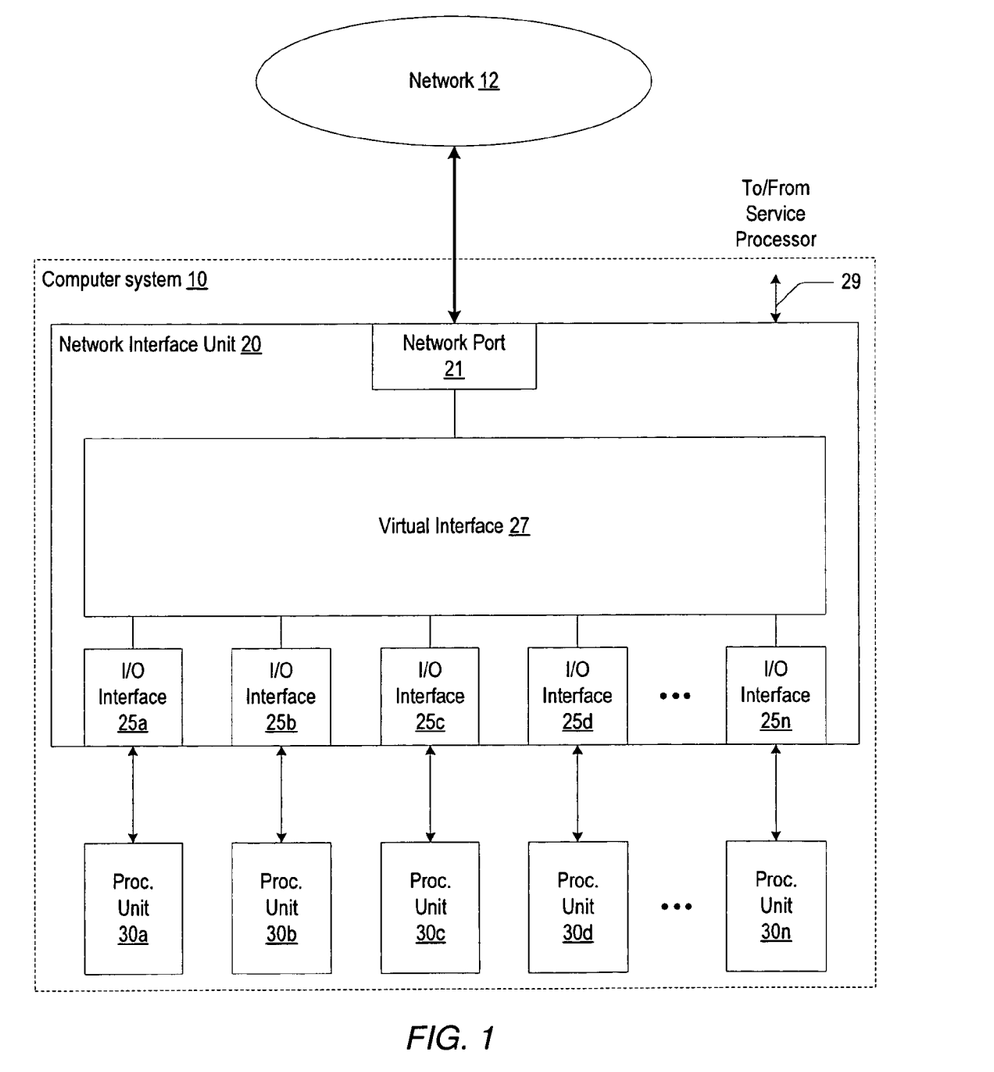
FIG. 1 is a block diagram of one embodiment of a computer system connected to a network.

Turning now to FIG. 1, a block diagram of one embodiment of a computer system connected to a network is shown. Computer system 10 includes a plurality of processing units designated 30a-30n, where n may be representative of any number. As shown, each of the processing units is coupled to a network interface unit 20. The network interface unit 20 is coupled to a network 12. It is noted that components having reference designators with a number and letter may be referenced by just the number where appropriate.

In one embodiment, each of the processing units 30 may be representative of a processing node such as a blade server, for example, that may include one or more processors or CPUs. However, it is contemplated that in other embodiments, any type of processing node may be used.

As shown in FIG. 1, the network interface unit 20 includes a network port 21, a virtual interface 27, and a plurality of input/output (I/O) interfaces, designated 25a-25n, where n may be representative of any number. The network port 21 may provide a connection to the network using a network protocol. In one embodiment, the network 12 may be any of a variety of frame-based protocols such as the Ethernet protocol. As such, the network connection may be a 10-Gigabit Ethernet (10 GE) network. Accordingly, as will be described in greater detail below, network port 21 may be configured to provide a cable or optical interface, as well as other network functions such as media access control (MAC) layer functions and physical (PHY) layer functions. In one embodiment, the I/O interfaces 25 may be representative of peripheral component interconnect (PCI) express (PCIe) compliant interfaces. Thus, each I/O interface 25 includes independently configurable configuration space.

The virtual interface 27 may provide sharing of the network port among the plurality of processing units 30. More particularly, the virtual interface 27 may provide a shared set of resources (e.g., MAC, statistics and control, DMA) that allow each processing unit 30 to substantially transparently share the network port 21. In other words, when combined with the independent I/O interfaces 25, it appears to each of the processing units 30 that each one is connected to a separate and independent network interface card (NIC), thereby creating a virtual NIC for each processing unit 30.

The virtual interface 27, creates a virtual Ethernet segment, thus removing the need for a network switch to handle communications between the processing units 30 and the network 12. Accordingly, as an Ethernet segment, each packet transmitted to the network 12 is seen by both the external network 12 and the internal virtual NIC for each processing unit 30 (except the sending processing unit).

The virtual interface 27 may also provide for both a shared domain that may be configurable by a maintenance or "service" processor (not shown) via a maintenance bus 29, and a number of separate processing unit or "blade" domains that may be configured and controlled by each processing unit 30 independently. In one embodiment, the shared domain may forward device errors and status to the blade domain through hardware. One such status is the link status, which may indicate if the blade domain if the network port 21 link is functioning properly. The link status may include the status of any external 10 GE support, the link layer status of the internal network interface unit 20, and the functional status of the shared domain. A failure in any of these may cause the link status to be bad, and the blade domain should react accordingly. In one embodiment, a blade domain may be interrupted upon any change in link status. In another embodiment, a software mailbox mechanism may be used for diagnostic purposes to provide low-speed communication between the service processor and the processing units 30.

Figure 2:
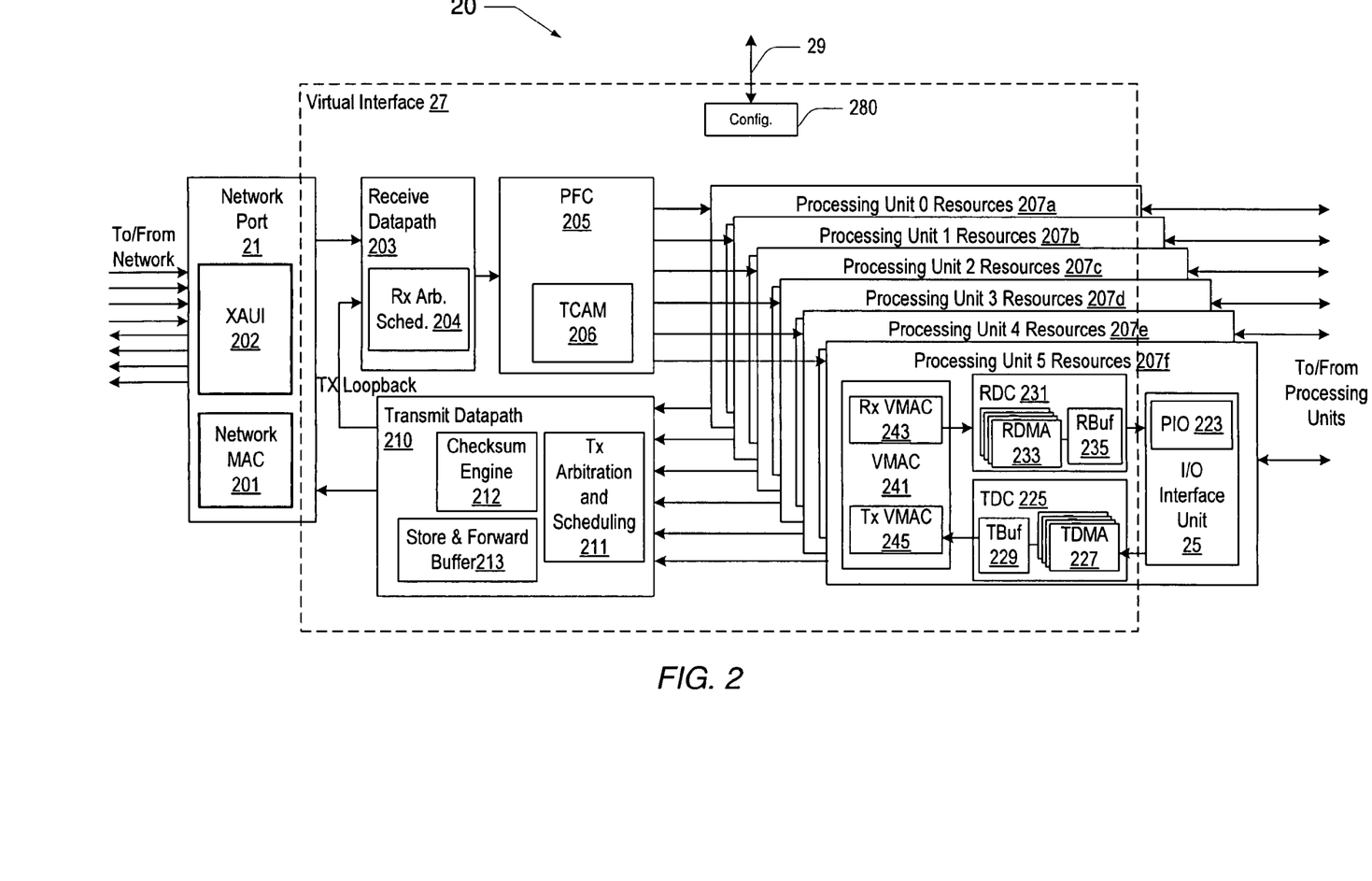
FIG. 2 is a block diagram illustrating more detailed aspects of an embodiment of the network interface unit of FIG. 1

Referring to FIG. 2, a block diagram illustrating more detailed aspects of an embodiment of the network interface unit 20 of FIG. 1 is shown. Network interface 20 includes a network port 21, and a virtual interface 27, which may include a number of I/O interface units 25 that each provide an I/O interconnect to a respective processing unit 30. In the illustrated embodiment, the network port 21 includes a network MAC 201 that may be configured to provide a number of features including full duplex operation at 10 Gbps, independent enable and disable or transmit and receive functions, detection of packet length errors, remote monitoring (RMON) statistics and error counters, cyclic redundancy code (CRC) calculation and error detection, programmable filtering of packets (including MAC and virtual local area network (VLAN)), padding of transmitted packets, and IEEE 802.3x flow control. It is noted that the circuits comprising the network interface unit 20 may be implemented as a single integrated circuit substrate. It is further noted that one or more network interface units 20 may be manufactured on a single integrated circuit substrate.

In one embodiment, the features of the network MAC 201 may be programmed or otherwise configured by the service processor. For example, the maintenance or service processor may configure the network port 21 as part of the configuration process of the network interface unit 20 using configuration registers 280. In addition, as described further below, the service processor may use the configuration registers 280 during a failure or failover event to reconfigure the network interface unit 20. The network MAC 21 may be placed in promiscuous mode so that all Rx traffic is seen by each virtual MAC (VMAC) 241 (described further below), as a network hub would do. For Tx traffic, the network MAC 21 may not generate CRC or add padding to any packet. Instead, the Tx VMAC 245 may be configured to generate all the bits for the frame such that network MAC 201 only has to transmit them to the port. However, the network MAC 201 may support Pause in the Rx direction, which may allow an external switch to throttle the processing units 30. In one implementation, it may not be desirable for the network interface unit 20 to pause the external switch, since doing so may create congestion in the network. Any received Rx pause frames may be forwarded to all the VMACs 241. In addition, the RMON statistics gathered by the network MAC 201 are the aggregate for the 10 GE link. Once read, the counters may automatically reset and begin counting from zero.

As shown, the network port 21 also includes an attachment unit interface (XAUI) 202 for connecting to the external network. In one embodiment, the XAUI 202 may be 10 GE-compliant and include four lanes, each including an integrated serializer/deserializer (SerDes) (not shown) that may operate at 3.125 Gbps. The four lanes may be bonded together into a single logical interface link to form the XAUI port. The XAUI 202 may be configured to communicate directly with an optical transceiver (not shown). The XAUI 202 port may also include independently controllable physical coding sublayer (PCS) functionality. It is contemplated that in other embodiments, other types of interfaces to the network such as a 10 Gigabit media independent interface (XGMII), for example, may be used.

In the illustrated embodiment, the virtual interface 30 includes a transmit datapath 210, a receive datapath 203, packet filtering and classification (PFC) unit 205, and six processing unit resources designated 207a through 207f, each of which may be connected to a respective processing unit such as processing unit 30 of FIG. 1. For example, processing unit resource 207a may be connected to processing unit 30a, processing unit resource 207b may be connected to processing unit 30b, and so forth. It is noted however, in other embodiments, there may be any number of processing unit resources.

In one embodiment, the transmit datapath 210 includes a transmit arbitration and scheduling unit 211 that may be configured to act as a fair multiplexer for packets sent by the processing units. Transmit arbitration and scheduling unit 211 may be configured to arbitrate between the re-order buffers of each processing unit resource for packet transmission using a deficit round robin arbitration scheme using a transmitted byte count. The weighting of all of the processing units 30 may be equal. For example, in the case of a fully loaded system, each processing unit 30 should receive no more than 17% of the bandwidth. However, if any of the processing units 30 are idle on transmit, the active processing units 30 may use the excess bandwidth to saturate the line.

In addition, the arbitration and scheduling unit 211 may be configured to schedule full packets from each Tx reorder buffer (e.g., TBuf 229). Further, the transmit datapath 210 may include checksum offload engine 212 that may perform a UDP/TCP checksum offload for all processing units. The transmit datapath 210 may also include a Tx Store & Forward Buffer 213 that may work in conjunction with the Checksum Offload engine so that a checksum for an entire packet can be placed in a packet header.

In one embodiment, the receive datapath 203 may be configured to frame packets along cycle boundaries. In addition, the receive datapath 203 includes a receive arbitration and scheduling unit 204 that may be configured to arbitrate between packets received from the network and packets received from the Tx loopback path.

In one embodiment, the PFC unit 205 may be configured to filter incoming packets based on MAC address and/or virtual LAN (VLAN) membership. If the filtering process identifies a single processing unit 30, a ternary content addressable memory (TCAM) 206 may be used to perform a TCAM classification based on, for example, L2/L3/L4 to identify a specific Rx DMA channel for the identified processing unit 30. As will be described in greater detail below, the PFC unit 205 may incorporate the filtering function of each VMAC unit. Accordingly, the PFC unit 205 may be individually configured by each processing unit 30, so that each processing unit 30 may control its own filtering options.

As shown, each processing unit resource 207 includes a respective one of the I/O interface units 25, each of which includes an independently configurable programmed I/O unit designated PIO 223. In addition, each processing unit resource 207 includes a VMAC 241, and receive and transmit DMA controllers, designated RDC 231 and TDC 225, respectively.

As described above, in one embodiment, the I/O interface unit 25 may be representative of a PCIe interface. Accordingly, each I/O interface unit 25 is an independent PCIe endpoint that may provide, in one implementation, the network interface unit 20 with six PCIe ×8 ports (i.e. each port includes 8 lanes). In such an implementation, each such port may be configured as a PCIe endpoint that provides 16 Gbps of full duplex user bandwidth to the PCIe hierarchy of a processing unit 30. In addition, each I/O interface link may also include an integrated SerDes per lane, each of which may run at 2.5 Gbps. The eight lanes may be bonded together into a single logical interface link that runs at 16 Gbps. The PIO unit 223 includes configuration and status registers, and supports memory mapped I/O posted and non-posted transactions, and as described above each I/O interface unit 25 may be connected to a single respective processing unit such as processing unit 30a of FIG. 1, for example. It is noted that in other implementations, other lane and link speeds may be used. For example, the lanes may each operate at 5 Gbps, for a total of 32 Gbps of full duplex user bandwidth to the PCIe hierarchy.

The virtual MAC functionality for each processing unit resource 207 may be physically separated into 3 distinct areas: Tx VMAC, Rx VMAC, and packet filtering and classification. Accordingly, in the illustrated embodiment, the VMAC 241 includes both a transmit VMAC 245 and a receive VMAC 243. As described above, the PFC unit 205 may incorporate the filtering function of each VMAC. Unlike the network MAC 201, each VMAC 241 has more configurability. More particularly, each VMAC 241 may be configured by the processing unit 30 to which the respective processing unit resource 207 is connected. For example, in one embodiment, a given processing unit 30 may configure such functions as TxEnable, TxPadding, TxCRC, RxEnable, Promiscuous, PromiscuousGroup, ErrorCheckDisable, RxCRCChkDisable, ReservedMulticast, RxCodeCheckDisable, HashFilterEn, AddrFilterEn, StripCRC, ReceivePauseEnable, and PassFlowControlFrame. In this way, the processing units 30 are truly independent of one another by having control of how packets are received and transmitted (e.g. strip out CRC). Also unlike the network MAC 201, the VMAC 241 allows each processing unit 30 to access full statistics on packets, just like what a physical NIC/MAC per processing unit would have provided.

As described above, the network interface unit 20 may only support Rx flow control coming from the network switch. More particularly, in one embodiment, when an incoming pause frame is seen, the network MAC 201 may cause its Tx to be throttled, which in turn may throttle back the Tx VMAC 245, if enabled for pause frames. The incoming pause frame can also be forwarded all the way to a processing unit 30 to throttle software. It is noted that typically, the network interface unit 20 may not generate an outgoing pause frame on its own. In one embodiment, software can generate such a frame. Outgoing pause frames that loop back can cause a VMAC to throttle (if enabled), and/or forward to processing units 30 for throttling by software.

The network interface unit 20 uses multiple DMA channels to transfer data to and from a processing unit's main memory. DMA allows the processing units' CPUs to perform other tasks while the network interface unit 20 transfers the packets for Tx and Rx. The DMA channels are serviced independently so that multiple processing units' CPUs may access their own DMA channels concurrently. In one specific implementation, the network interface unit 20 supports a total of 24 Rx and 24 Tx DMA channels. In one embodiment, the DMA channels are divided evenly among the processing units, with each processing unit 30 having four dedicated Rx and Tx DMA channels. This allows for greater concurrency among the processing units. DMA scheduling may be performed on packet boundaries.

Accordingly, in the illustrated embodiment, the receive DMA controller (RDC) 231 includes a plurality of receive DMA (RDMA) contexts or channels 233 which are coupled to a receive first-in-first-out (FIFO) buffer (RBuf) 235. Similarly, the transmit DMA controller (TDC) 225 includes plurality of transmit DMA (TDMA) contexts or channels 229 which are coupled to a transmit reorder buffer (TBuf) 229. As discussed above, there may be four transmit and four receive channels. In one implementation, each RDMA channel 233 may include ring buffers and control logic (not shown) that may function to push packets into memory. In addition, the RDC 231 may be programmed to send to a given processing unit notifications such as timeouts, and packet number threshold crossings, for example, to prevent packets from sitting too long.

As shown, the four TDMA channels 227 associated with a PCIe port share TBuf 229. The TDMA channels 227 may support transmit gather for up to fifteen separate buffers. In one implementation, each TDMA channel 227 may include a Tx descriptor ring and a descriptor cache (not shown) that may be shared among the four channels. The descriptor ring may function as a gather list of the buffers, and may hold pointers to packets for transmission. Rather than adding packets one at a time, software may use kick registers to add multiple packets. A kick register is used by software to add buffers to the ring and to inform the network interface unit 20 that packets are available for the DMA channel to retrieve from memory. The descriptor cache may allow for up to two cache lines worth of Tx descriptors to be stored for each DMA channel. The Tx descriptors may be cached and presented to the Tx datapath 210. In one implementation, each descriptor may be 8 bytes and 128 bytes worth of descriptors may be cached in a logical FIFO per DMA channel. Additional descriptors may be requested under certain conditions. For example, if the descriptor cache is empty, or the descriptor cache has data, but has enough space for an additional cache line worth of descriptors, additional descriptors may be requested.

Control logic within the Tx datapath 210 may request descriptors from the DMA channel and then request the packets from main memory. Multiple outstanding transactions may be supported to absorb the request latency over PCIe and to keep data flowing constantly. Packet data are sent to TBuf 229 to preserve ordering of packets within a DMA channel because PCIe read completions may arrive out of order for different transaction IDs.

In one embodiment, TDC 225 may support multiple outstanding requests in order to compensate for the latency of requests across PCIe by keeping the TBuf 229 as full as possible. For example, TDC 225 may check for space in the TBuf 229, allocate space to the next packet requested, and then send the request to the PCIe interface. The TDC 225 uses TBuf 229 to guarantee packet ordering within a DMA channel. More particularly, in the PCIe protocol, the ordering of completions between different requests is not guaranteed, while completions for the same request ID are guaranteed to arrive in address order. When the TDC 225 checks for space in the TBuf 229, it allocates the space and associates the space with a specific PCIe transaction ID to put the packet completions in the correct location, and packets are only requested when there is space for the packet in the TBuf 229. Packet transmission is considered completed when the entire packet has been transmitted from the TBuf 229. DMA status registers (not shown) may be updated when packet transmission is complete. In addition, software may mark a packet to trigger an interrupt. When such an interrupt is triggered, the DMA status registers may be updated before the interrupt is issued by the network interface unit 20.

The layer 2 header of incoming packets must be parsed so that the packet is sent to the correct processing unit(s), depending on the address and filter configuration of each VMAC 241. In one embodiment, PFC 205 may be configured to parse the layer 2 header to determine if a processing unit 30 will accept the packet. For example, PFC 205 may parse the Ethernet Destination Address of the packet for the purposes of address matching, filtering, and multicast identification. In addition, the Type/Length must be parsed to determine the packet type. If the packet is a VLAN enabled frame, the VLAN ID is also extracted. In one implementation, PFC 205 may maintain four MAC address/filter pairs per processing unit 30 to determine whether a packet should be forwarded to each processing unit 30. In addition, PFC 205 may maintain a multicast hash table or the like, to filter out multicast packets, and a VLAN ID table to determine VLAN membership for the processing units 30.

Once the destination processing unit 30 has been determined, the packet header may be parsed for the L3/L4 fields, and a TCAM lookup key may be built using the destination processing unit ID and certain header fields, and the key sent to the TCAM 206 for classification. The results of the TCAM lookup are used to determine the specific DMA channel of a processing unit, or if the packet should be dropped. If no match is found, the packet is sent to a default DMA channel for that processing unit 30. In one implementation, packets may be spread to multiple DMA channels depending on the result of the TCAM classification. If traffic spreading is enabled for a particular TCAM entry, the source IP address and the destination L4 port, for example, may be hashed, and a number of the low order bits (e.g., lower 2 bits) may be used to index a DMA channel. The hashing algorithm may be implementation specific. In some embodiments, polynomial hashing may be used and based on a particular polynomial.

Figure 3:
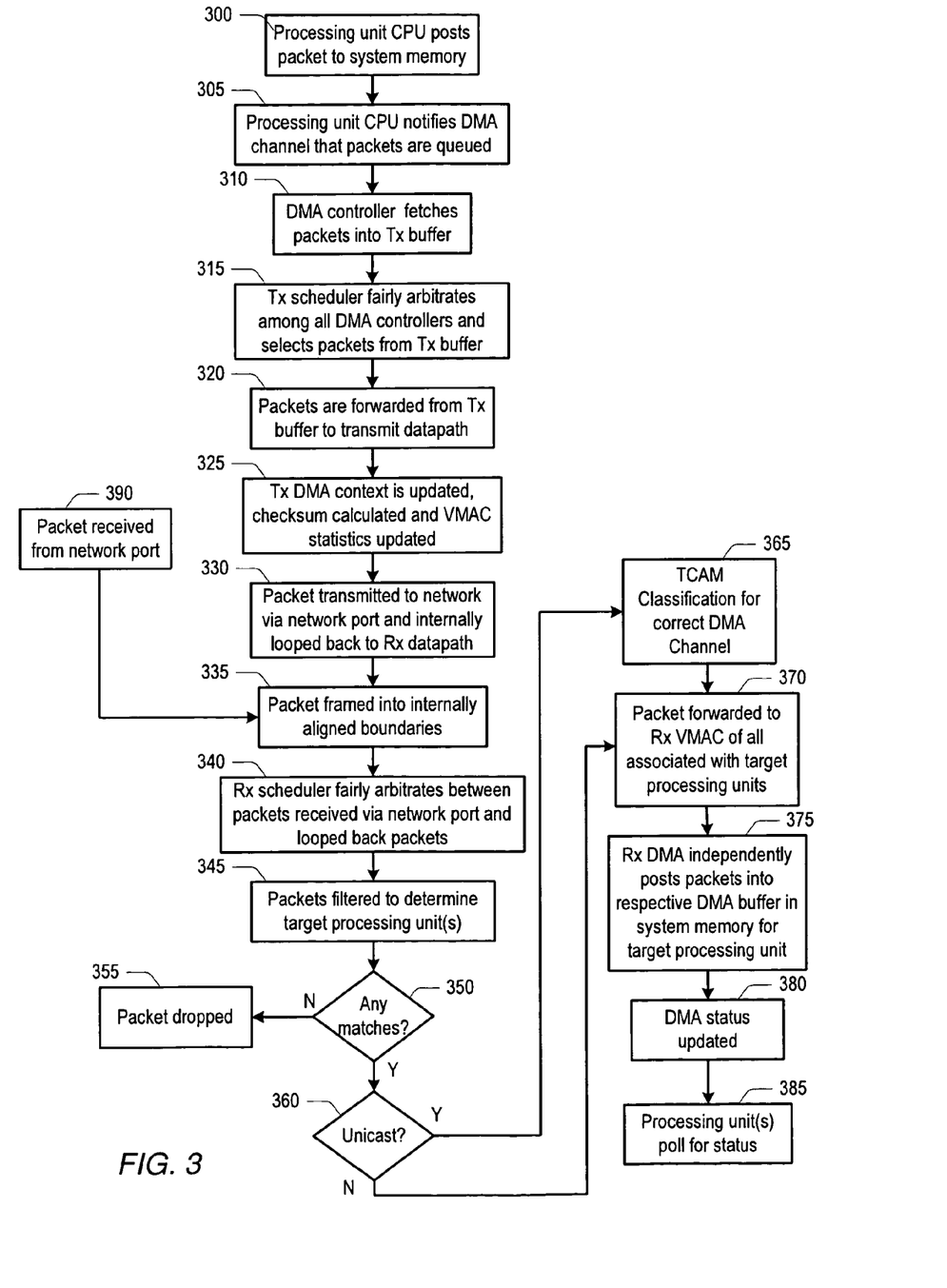
FIG. 3 is a flow diagram describing the operation of the network interface shown in FIG. 1 and FIG. 2.

In FIG. 3, a flow diagram describing the operation of the network interface unit 20 of FIG. 1 and FIG. 2 is shown. Referring collectively to FIG. 1 through FIG. 3, the packet flow through the network interface 20 is described. Beginning with block 300, a CPU of a given processing unit 30 sends one or more packets to locations in system memory that have been allocated as DMA buffer space for that processing unit. The CPU may also notify, via the respective I/O interface 25, a particular TDMA channel 227 that there are packets to be transferred (block 305). Packet descriptors may be cached by the TDC 225 within a descriptor cache as described above. Based upon the descriptors, the TDC 225 may allocate space within reorder buffer, TBuf 229 and then fetch the waiting packet(s) from the DMA buffer(s) in system memory into TBuf 229 (block 310). In one embodiment, the TDC 225 may attempt to keep the TBuf 229 as full as possible. Once complete packets are queued in TBuf 229, the Tx arbitration and scheduler 211 arbitrates between the packets in the TBuf 229 of each of the processing unit resources 207. It is noted that the processing units 30 may concurrently send packets to system memory. Likewise, each of the DMA controller engines (e.g., TDC 225) may concurrently fetch packets from the system memory.

In one embodiment, the Tx arbitration and scheduler 211 may use a deficit round robin (DRR) arbitration scheme, in which the weighting of all processing units may be substantially equal. For example, in a fully loaded system with six processing units, each processing unit would have approximately 17% of the transmit bandwidth. However, if any of the processing units are idle on transmit, the active processing units may use the excess bandwidth to saturate the output port.

Packets are selected and sent from TBuf 229 (block 320) to the Tx datapath 210. Transmission is considered complete by the TDC 225 when the entire packet has been sent from the TBuf 229. The TDMA context is updated, the VMAC statistics are updated, the packets are stored in the store and forward buffer 213, and the checksum engine 212 generates a checksum (block 325). In one embodiment the checksum is a UDP/TCP checksum. As such, the checksum is computed for an entire packet and the checksum field is in the packet header. The entire packet is stored before transmission so that the header can be rewritten.

However, in other embodiments, the checksum engine 212 may perform a TCP/UDP checksum on a per packet basis. In such embodiments, the Tx datapath 210 may not process IP options, and therefore may not parse any IP source route options. Thus, it may not produce the correct pseudo-header for TCP/UDP checksum purposes because it does not know the final IP destination address. To solve this problem, software puts a partial checksum computed over the pseudo header in the checksum field, and the checksum engine 212 performs a checksum over the TCP/UDP payload without zeroing out the checksum field.

It is noted that in some embodiments, an internal header may be added to packets scheduled for transmission. The header may include information that indicates the checksum and CRC operations that are to be performed on the packet. However, this internal header may be stripped off by hardware before transmission.

The packets are now ready for transmission to the network 12. Accordingly, the Tx datapath 210 sends the packets to the network MAC 201, which forwards the packets to the XAUI 202 for transmission to the network 12. In addition, as described above, the packets are forwarded to the Rx datapath 203 via the TX loopback path (block 330).

The receive datapath flow is described beginning in block 335. It is noted that the flow is the same as if packets are received via the network port 21 as shown in block 390. Accordingly, when packets are received on the Rx datapath 203, the packets may be framed into internally aligned cycle boundaries at a specific width (block 335). The Rx arbitration and scheduler 204 fairly arbitrates between packets received via the TX loopback path and packets received via the network port 21 (block 340). Selected packets are filtered to determine the destination or target processing unit(s) (block 345). For example, the PFC unit 205 may be configured to compare the destination MAC address of the packet to the MAC addresses assigned to all processing units 30. In addition, the destination MAC address of the packet may be compared to multicast MAC addresses and VLAN group membership of each processing unit 30. As described above, one or more tables may store multicast address information as well as VLAN membership information.

If there are no matches to the destination MAC address, the packet may be dropped (block 355). However, if there are matches in the multicast table and the VLAN membership, the packet is forwarded to the RX VMAC 243 of all processing unit resources 207 that have matching MAC addresses (block 370). The Rx VMAC 243 statistics are updated. In one embodiment, the packet is sent to an RDMA channel 233 that has been programmed by the processing unit 30 as a default DMA channel for multicast packets. The Rx DMA channel 233 may store packets into the RBuf 235, and as packets are stored in RBuf 235, control logic within each of the RDC 231 may push packets into respective designated DMA buffers in system memory for the destination processing units (block 375). It is noted that software executing on the individual processing units may independently program their respective DMA control logic with the locations of the DMA buffers in system memory. The control logic within the RDC 231 may also update the descriptors and the DMA status (block 380). The processing unit software may poll the DMA status to know when a packet has been posted to system memory (block 285).

Referring back to block 360, if the packet is a unicast packet, then a TCAM classification is performed to determine to which DMA channel to send the packet. For example, if there is a TCAM match the packet is forwarded to the DMA channel indicated by the TCAM 206. However, if there is no match, the packet may be sent to the default DMA channel as described above in conjunction with block 370.

Figure 4:
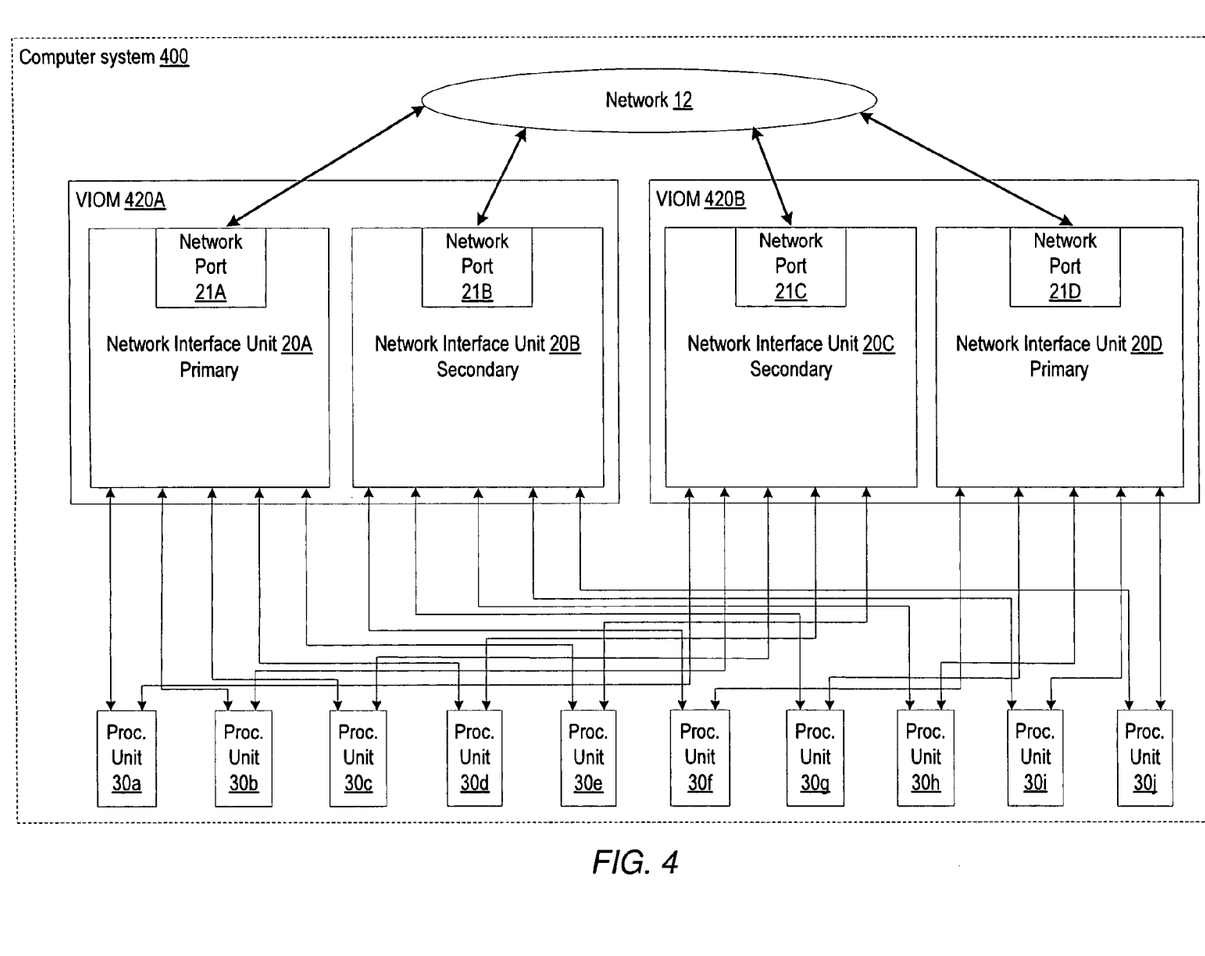
FIG. 4 is a block diagram of another embodiment of a computer system including a second network interface unit.

The ability of a network interface unit 20 to act like a virtual Ethernet segment may allow the computer system 10 to have a robust failover mechanism. More particularly, as described above the service processor may monitor system operations and detect failures. If a failure is detected in a network interface 20, the service processor may reconfigure the system dynamically, on the fly. More particularly, in a high reliability, accessibility, serviceability (RAS) system, redundant backups may be used. For example, in FIG. 4, two pairs of network interface units 20 are used in a redundant configuration. In some embodiments, a blade chassis may be configured to have two network interface units 20 in a virtual I/O module (VIOM). In FIG. 4, a block diagram of a computer system including two pairs of independently connected network interface units is shown.

Turning to FIG. 4, the computer system 400 includes two VIOMs, designated 420A and 420B, each including two network interface units 20, labeled 20A through 20D. In the illustrated embodiment, there are ten processing units, or blades, designated 30a though 30j. The network interface units 20 are all connected independently to the network 12. As shown, there is a primary and a secondary network interface unit in each VIOM. As such, the secondary network interface unit 20 of each VIOM may be in a standby mode, since each processing unit 30 is coupled to a primary network interface unit 20 of one VIOM and a secondary network interface unit 20 of the other VIOM.

In the event a failure of either primary network interface unit 20 is detected, the failover from one virtual NIC of one network interface unit 20 to another network interface unit 20 can be done without affecting other processing units because the network function that is shared among different blades does not participate in such a failover event. In one embodiment, the service processor may notify the affected processing units through their respective software mailboxes or through hardware such as the interrupt mechanisms described above. For example, if the 10 GE uplink from network interface unit 20A is physically down, the service processor may notify the affected processing units, then the processing units 30a-30e may be configured to failover one at a time, to the secondary network interface unit 20C. In one embodiment, the processing units 30a-30e may simply borrow the MAC address from their respective virtual NICs within network interface unit 20A and append the MAC addresses to their associated virtual NICs within network interface unit 20C. However, it is noted that while a processing unit may "borrow" the MAC address from its virtual NIC and append it to the other virtual NIC that it owns, any card removal event from the VIOM with the borrowed MAC must cause software to disable using the borrowed MAC immediately since the processing unit no longer owns that virtual NIC and consequently, the associated MAC address.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
one or more processing units;
a network interface unit coupled to the one or more processing units, wherein the network interface includes:
a network port for connection to a network, wherein the network port includes a shared media access control (MAC) unit;
a virtual interface coupled to the network port, wherein the virtual interface is configured as a network segment and includes:
a plurality of processing unit resources each associated with a respective one of the one or more processing units;
wherein each of the processing unit resources includes:
an I/O interface unit coupled to a respective one of the one or more processing units via an I/O interconnect;
an independent programmable virtual MAC unit that is programmably configured by the respective one of the one or more processing units;
a receive datapath and a transmit datapath that are coupled between and shared by the plurality of processing unit resources and the network port, wherein the receive datapath includes a packet filter unit configured to determine, based upon a destination MAC address included within each packet, if any of the one or more processing units is a target for each packet;
an internal loopback path, wherein a packet originating from a given processing unit of the plurality of processing units and transmitted to the network via the network port is also sent via the internal loopback path to the receive datapath;
wherein the virtual interface is configured to distribute an available communication bandwidth of the network port between the one or more processing units.

2. The system as recited in claim 1, wherein the network port is configured to transmit and receive frame-based signals compatible with any of a plurality of Ethernet technologies.

3. The system as recited in claim 1, wherein the shared MAC unit is shared among the processing unit resources, and is controlled by a service processor that is different than any of the one or more processing units.

4. The system as recited in claim 1, wherein each of the plurality of I/O interface units includes an independently programmable configuration space that is configured by a respective processing unit to which it is connected.

5. The system as recited in claim 1, wherein each virtual MAC unit is associated with a plurality of MAC addresses.

6. The system as recited in claim 1, wherein each of the processing unit resources includes a receive direct memory access controller, a plurality of receive DMA channels, and a receive buffer, wherein each of the receive DMA channels is configured to independently and concurrently receive and store packets within the receive buffer, and wherein the receive DMA controller is further configured to push the packets stored in the receive buffer to storage locations allocated in a system memory.

7. The system as recited in claim 6, wherein each of the processing unit resources includes a transmit DMA controller, a plurality of transmit DMA channels, and a transmit buffer, wherein each of the transmit DMA channels is configured to independently and concurrently fetch packets from additional storage locations allocated in the system memory and to store the packets in the transmit buffer for transmission on the network.

8. The system as recited in claim 7, wherein the transmit datapath includes a scheduling and arbitration unit configured to schedule and select packets for transmission from each of the transmit buffers.

9. The system as recited in claim 1, wherein the shared MAC unit is programmably configured by a service processor that is different from the one or more processing units.

10. A network interface device for connection between one or more processing units and a network comprising:
- a network port for connection to the network, wherein the network port includes a shared media access control (MAC) unit; and
- a virtual interface coupled to the network port and is configured as a network segment, wherein the virtual interface includes:
  - a plurality of processing unit resources each associated with a respective processing unit of the one or more processing units;
  - wherein each of the processing unit resources includes:
    - an I/O interface unit coupled to a respective one of the one or more processing units via an I/O interconnect;
    - an independent programmable virtual MAC unit that is programmably configured by the respective one of the one or more processing units;
  - a receive datapath and a transmit datapath that are coupled between and shared by the plurality of processing unit resources and the network port, wherein the receive datapath includes a packet filter unit configured to determine, based upon a destination MAC address included within each packet, if any of the one or more processing units is a target for each packet;
  - an internal loopback path, wherein a packet originating from a given processing unit of the plurality of processing units and transmitted to the network via the network port is also sent via the internal loopback path to the receive datapath;
- wherein the virtual interface is configured to distribute an available communication bandwidth of the network port between the one or more processing units.

11. The network interface as recited in claim 10, wherein the network port is configured to transmit and receive frame-based signals compatible with any of a plurality of Ethernet technologies.

12. The network interface as recited in claim 10, wherein the shared MAC unit is shared among the processing unit resources, and is controlled by a service processor that is different than any of the one or more processing units.

13. The network interface as recited in claim 10, wherein each of the plurality of I/O interface units includes an independently programmable configuration space that is configured by a respective processing unit to which it is connected.

14. The network interface as recited in claim 10, wherein each virtual MAC unit is associated with a plurality of MAC addresses.

* * * * *